United States Patent Office 3,579,674
Patented May 25, 1971

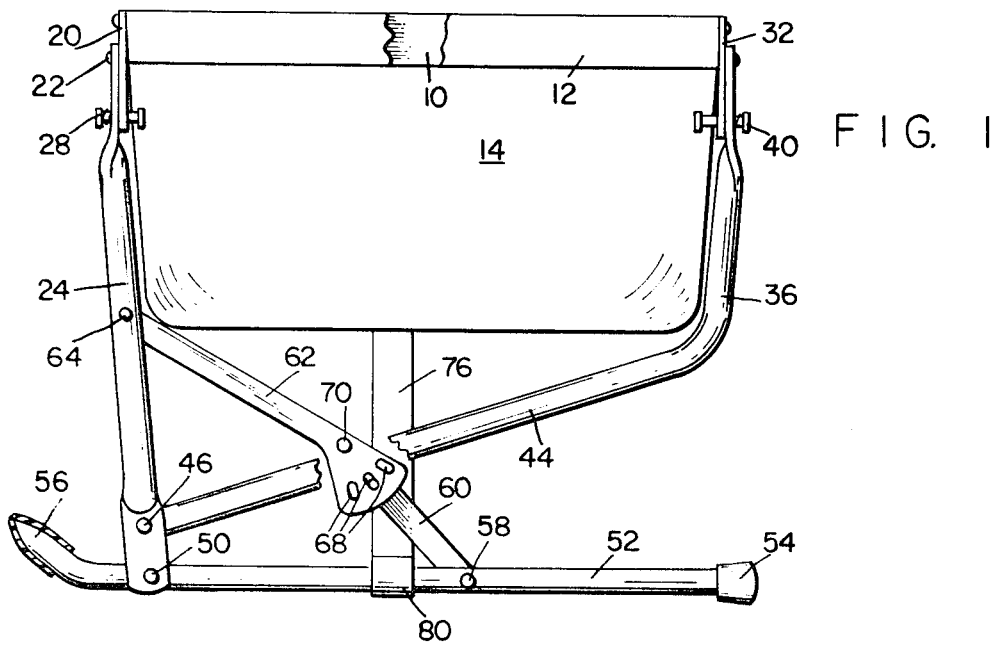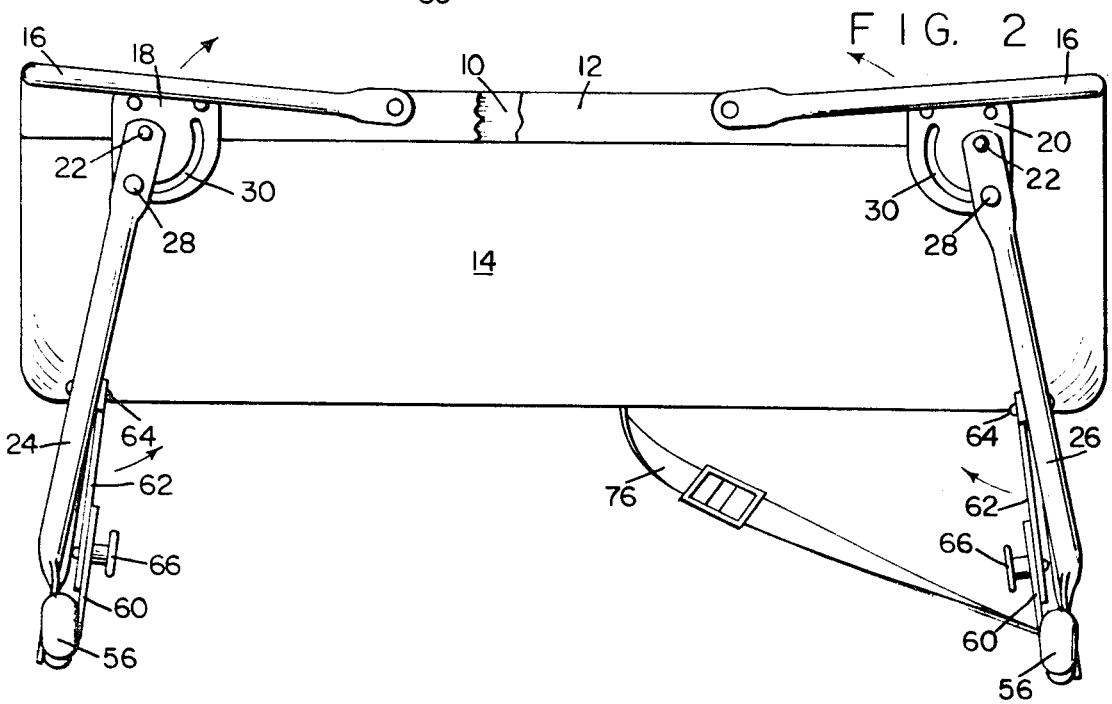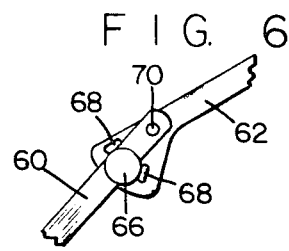

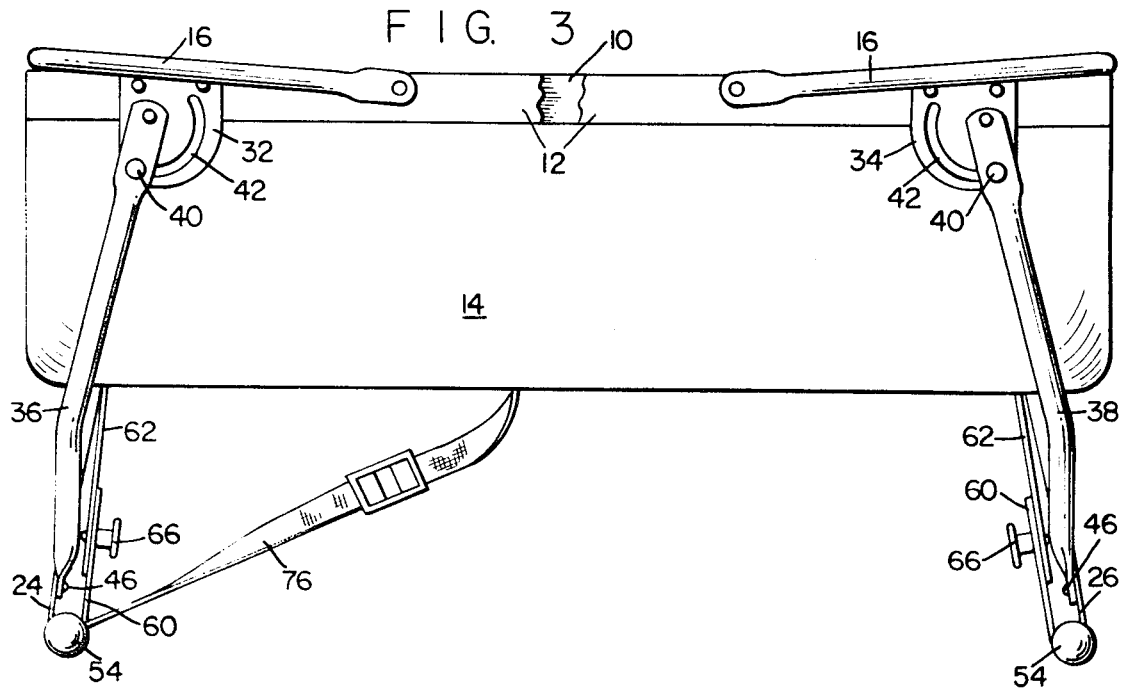
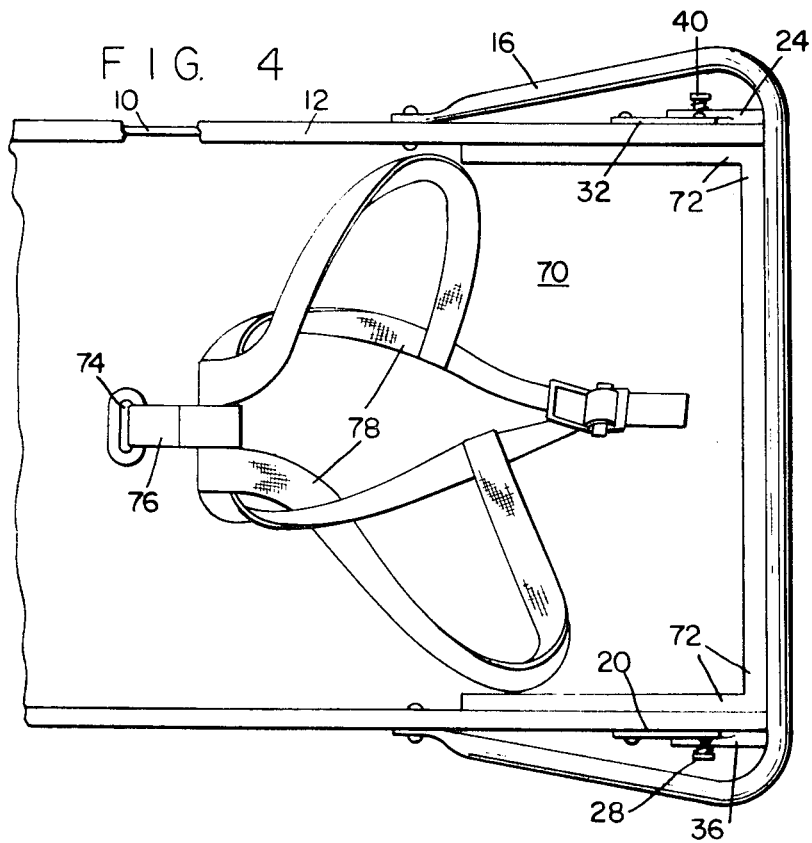

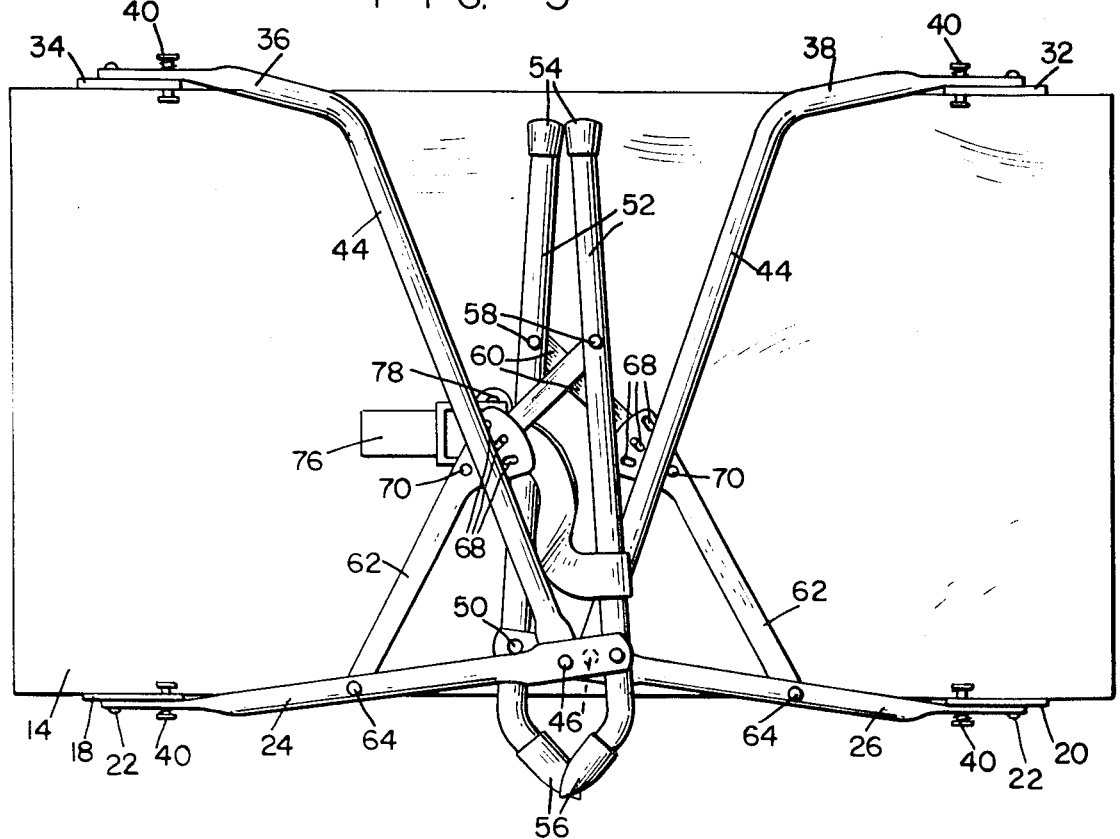

3,579,674
INFANT'S SAFETY CAR BED
Zoel W. Blais, Templeton, and Harold F. Shaw, Leominster, Mass., assignors to Thayer, Inc., Gardner, Mass.
Filed Nov. 13, 1969, Ser. No. 876,293
Int. Cl. A47d 7/04
U.S. Cl. 5—94                                10 Claims

ABSTRACT OF THE DISCLOSURE

A folding car bed comprising an upper open rectangular frame and a depending flexible body support with a mattress therein, a safety harness, a strap on the safety harness extending through the mattress and the bottom of the flexible support for securement underneath the same; a folding leg frame on the upper frame at each end thereof, each leg frame comprising a forwardly extending free-ended foot having a rearwardly extending spur thereon, each foot being pivotally mounted with respect to its leg, an adjustable locking bracket for each foot, said leg frames being foldable flatwise against the upper frame.

BACKGROUND OF THE INVENTION

Many car beds for infants have been devised and some have been marketed. They all however have deficiencies with regard to ease of setup and folding so as to be carried flat, but difficulties have appeared principally in the area of the safety of the child. It is well understood that sudden stops will throw the child forward and that vehicles striking in the rear will cause the child to be thrown to the opposite direction. It is desirable to have the car bed firmly anchored so that it cannot become detached or tipped, nor even to slide with relation to the vehicle or the seat. It is convenient to position such car beds on the rear seat of the vehicle but the car bed is not as wide as the distance between the front of the backrest of the rear seat and the rear of the backrest of the front seat, and means must be provided for anchoring the car bed in position. This invention presents improvements in the car bed and especially improved constructions for increased safety of the child.

SUMMARY OF THE INVENTION

In the present case, means is provided for anchoring the car bed firmly between the rear edge of the rear seat and the lower edge of the backrest of the rear seat; in addition, the novel car bed can be strapped down by means of the usual safety belts for the rear seat, so that the bed is impossible to dislodge from its position closely adjacent the backrest of the rear seat of the vehicle. At the same time means is provided for adjustably leveling the car bed, most rear vehicle seats slanting upwardly.

In the present case the car bed comprises an open rectangular upper frame of rectangular shape from which depends a flexible fabric support for the child. In this support there is a stiffer but still relatively soft mattress and a safety head protector, the mattress having an aperture in it for the reception of a strap to a baby harness in the bed, the strap extending down through the mattress and the bottom of the flexible support, said strap being adjustably connected to one or both of a pair of folding leg frames swivelly mounted at opposite ends of the upper frame, each leg frame including a leg and a forwardly extending elongated foot transversely arranged relative to the upper frame, each foot being pivotally mounted with respect to its leg, and having an adjustable brace for holding the respective foot at certain selective angles with respect to its leg, each foot embodying a rearwardly extending spur for firmly anchoring the entire construction between the car seat and the backrest thereof. The structure is such that it is very easy to secure the safety belts found in modern cars across the feet to additionally anchor the bed in position. The legs can be swung up to encompass the flexible body support between in flatwise condition against the rectangular upper frame. Also there may be provided pivoted handles by which the entire device may be carried.

BRIEF DESCRIPTION OF THE DRAWINGS

FIG. 1 is a view in end elevation illustrating the invention in extended condition;
FIG. 2 is a view in rear elevation thereof;
FIG. 3 is a view in front elevation;
FIG. 4 is a top plan view of one end of the car bed;
FIG. 5 is a bottom plan view illustrating the car bed in folded condition, and
FIG. 6 is a detail view of the foot adjustment latch.

PREFERRED EMBODIMENT OF THE INVENTION

A rectangular open, upper frame 10 supports by means of a hemmed sleeve or the like 12 a flexible body 14 of any desirable or suitable material. The frame may have a pair of pivoted U-shaped handles 16 which may selectively lie as shown in FIG. 2 to expose the entire area of the upper frame, or they may be pivoted up as is well known to act as a carrying means.

Exterior of the sleeve 12, at each corner of the frame, there are provided plates 18 and 20, see FIG. 2, which are riveted thereto and to which are pivotally secured at 22 rear leg members 24, 26. Each of these legs is provided with a manually actuated latch member 28 riding in an arcuate slot 30 which automatically latches the legs in the extended position of FIG. 2. These latch members are manually pushed inwardly in order to release the same in a manner well known in the art, so that the legs can be folded to the FIG. 5 position flatwise in closely spaced relation relative to the upper frame 10.

At the front of the upper frame 10 there are similar plates indicated at 32 and 34 which pivotally mount the front leg members 36, 38 which have manually releasable latches 40, 40 riding in arcuate grooves 42, 42. However the front legs 36, 38 extend downwardly as shown in FIG. 1 only just enough to clear the body 14 and are bent to the rear as at 44 continuing to a point where they are connected at 46 with respect to the lower end portions of the rear legs 24, 26 although slightly spaced above the lowermost extremities thereof.

The front and rear legs at each end of the car bed form substantially rigid leg frames. Pivoted as at 50 at the lower extremity of each rear leg 24 and 26 there is provided a lateral foot 52, 52. These feet are free-ended toward the front and are provided with end protective caps at 54.

To the rear these feet extend beyond the rear legs 24, 26 terminating in spurs 56 which are insertable under the lower edge of the backrest of the rear vehicle seat, and then the entire frame is brought downwardly so that the feet 52, 52 rest on the car seat. It will be noted that these feet are free of the leg frames at the forward portions thereof.

Each of the feet 52 has pivotally connected thereto as at 58 a link 60, the construction being the same at both ends of the device. These links are connected with respect to links 62 pivotally connected at 64 to the rear legs at an intermediate point thereof, see particularly FIG. 1. The end of link 60 carries with it a manually manipulated spring-pressed locking button 66, this being well known in the art, and this rigidly connects links 60 in any one of three different positions with link 62 according to the three apertures therein which are indicated